United States Patent
Henry et al.

(10) Patent No.: US 9,319,694 B2
(45) Date of Patent: *Apr. 19, 2016

(54) METHOD FOR ENCODING AND DECODING IMAGES, ENCODING AND DECODING DEVICE, AND CORRESPONDING COMPUTER PROGRAMS

(71) Applicant: DOLBY INTERNATIONAL AB, Amsterdam Zuidoost (NL)

(72) Inventors: Felix Henry, Saint Gregoire (FR); Stephane Pateux, Rennes (FR); Gordon Clare, Pace (FR)

(73) Assignee: DOLBY INTERNATIONAL AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,463

(22) Filed: Mar. 19, 2015

(65) Prior Publication Data

US 2015/0195538 A1 Jul. 9, 2015

Related U.S. Application Data

(60) Division of application No. 14/492,750, filed on Sep. 22, 2014, which is a continuation of application No. 14/128,949, filed on Apr. 21, 2014, which is a division of application No. PCT/FR2012/051391, filed on Jun. 20, 2012.

(30) Foreign Application Priority Data

Jun. 24, 2011 (FR) ...................................... 11 55606

(51) Int. Cl.
*H04N 7/12* (2006.01)
*H04N 19/13* (2014.01)
(Continued)

(52) U.S. Cl.
CPC ......... *H04N 19/13* (2014.11); *H04N 19/00951* (2013.01); *H04N 19/124* (2014.11);
(Continued)

(58) Field of Classification Search
CPC .......... H04N 19/00951; H04N 19/124; H04N 19/13; H04N 19/137; H04N 19/174
See application file for complete search history.

(56) References Cited

U.S. PATENT DOCUMENTS 6,480,537 B1   11/2002  Agrawal
7,463,781 B2 * 12/2008  Pearson et al. ................ 382/247
(Continued)

FOREIGN PATENT DOCUMENTS

WO   WO2010063184 A1   6/2010
WO   WO2011042645 A1   4/2011

OTHER PUBLICATIONS

NTT DOCOMO, Inc. et al., "Annex A CDCM Video Codec: Decoder Specification," Joint Collaborative Team on Video Coding (JCT-VG) of ITU-T SG16 WP3 and ISO/IEC JTC1/SC29/WG11, 1st Meeting: Dresden, DE, Apr. 15-23, 2010, pp. 1-107 (Apr. 2010).

(Continued)

*Primary Examiner* — Nhon Diep
(74) *Attorney, Agent, or Firm* — Fish & Richardson P.C.

(57) ABSTRACT

A method for coding includes; segmenting an image into blocks; grouping blocks into a number of subsets; coding, using an entropy coding module, each subset, by associating digital information with symbols of each block of a subset, including, for the first block of the image, initializing state variables of the coding module; and generating a data sub-stream representative of at least one of the coded subsets of blocks. Where a current block is the first block to be coded of a subset, symbol occurrence probabilities for the first current block are determined based on those for a coded and decoded predetermined block of at least one other subset. Where the current block is the last coded block of the subset: writing, in the sub-stream representative of the subset, the entire the digital information associated with the symbols during coding of the blocks of the subset, and implementing the initializing sub-step.

20 Claims, 9 Drawing Sheets

(51) Int. Cl.

| | |
|---|---|
| *H04N 19/91* | (2014.01) |
| *H04N 19/196* | (2014.01) |
| *H04N 19/50* | (2014.01) |
| *H04N 19/503* | (2014.01) |
| *H04N 19/176* | (2014.01) |
| *H04N 19/51* | (2014.01) |
| *H04N 19/61* | (2014.01) |
| *H04N 19/593* | (2014.01) |
| *H04N 19/124* | (2014.01) |
| *H04N 19/137* | (2014.01) |
| *H04N 19/174* | (2014.01) |
| *H04N 19/44* | (2014.01) |
| *H04N 19/436* | (2014.01) |
| *H04N 19/625* | (2014.01) |
| *H04N 19/136* | (2014.01) |

(52) U.S. Cl.
CPC .......... *H04N19/136* (2014.11); *H04N 19/137* (2014.11); *H04N 19/174* (2014.11); *H04N 19/176* (2014.11); *H04N 19/196* (2014.11); *H04N 19/197* (2014.11); *H04N 19/436* (2014.11); *H04N 19/44* (2014.11); *H04N 19/50* (2014.11); *H04N 19/503* (2014.11); *H04N 19/51* (2014.11); *H04N 19/593* (2014.11); *H04N 19/61* (2014.11); *H04N 19/625* (2014.11); *H04N 19/91* (2014.11)

(56) References Cited

U.S. PATENT DOCUMENTS

| | | | | |
|---|---|---|---|---|
| 8,319,672 | B2* | 11/2012 | Kim et al. | 341/107 |
| 8,520,740 | B2* | 8/2013 | Flachs et al. | 375/240.25 |
| 8,824,813 | B2 | 9/2014 | Sasaki | |
| 8,953,692 | B2 | 2/2015 | Tanaka | |
| 2010/0098155 | A1* | 4/2010 | Demircin et al. | 375/240.02 |
| 2010/0135416 | A1 | 6/2010 | Huang | |
| 2012/0014433 | A1 | 1/2012 | Karczewicz | |
| 2012/0082215 | A1 | 4/2012 | Sze | |
| 2012/0207213 | A1 | 8/2012 | Amon | |
| 2012/0219066 | A1* | 8/2012 | Amonou et al. | 375/240.21 |
| 2012/0263232 | A1 | 10/2012 | Pateux | |
| 2012/0293343 | A1* | 11/2012 | Lee et al. | 341/51 |
| 2013/0187798 | A1 | 7/2013 | Marpe | |
| 2014/0010312 | A1 | 1/2014 | Song | |
| 2014/0016700 | A1 | 1/2014 | Henry | |
| 2014/0254665 | A1 | 9/2014 | Henry | |

OTHER PUBLICATIONS

Sharp, "Entropy slices for parallel entropy decoding," ITU-I SG16 Meeting, Apr. 22, 2008-May 2, 2008, Geneva, pp. 1-9 (Apr. 14, 2008).
Sze et al., "Massively Parallel CABAG," 38th VCEG Meeting, 89 MPEG Meeting, Jul. 1, 2009-Jul. 8, 2009, London, Geneva (Video Coding Experts Group of ITU-T SG. 16), pp. 1-10 (Jul. 3, 2009).
Office Action issued in U.S. Appl. No. 14/492,546 on Feb. 4, 2015, 29 pages.
International Search Report issued in PCT/FR2012/050380 on May 8, 2012, with English translation, 7 pages.
Written Opinion of the International Searching Authority issued in PCT/FR2012/050380 on May 8, 2012, with English translation, 11 pages.
International Preliminary Report on Patentability issued in PCT/FR2012/050380 on Sep. 13, 2013, 6 pages (in French).
International Search Report issued in PCT/FR2012/051391, on Aug. 9, 2012, with English translation, 7 pages.
Written Opinion issued in PCT/FR2012/051391, on Aug. 9, 2012, with English Translation, 14 pages.
International Preliminary Report on Patentability issued in PCT/FR2012/051391, on Dec. 23, 2013, 7 pages (in French).
International Search Report and Written Opinion dated Aug. 1, 2012 for corresponding International Application No. PCT/FR012/051391, filed Jun. 20, 2012.
Bossen, "Common Test Conditions and Software Reference Configurations," 5th JCT-VC Meeting, Geneva, Mar. 2011 (JCTVC-E700), 11 pages.
Fuldseth et al., "Tiles," 5th JCT-VC Meeting, Geneva, Mar. 2011 (JCTVC-E408), 14 pages.
Henry and Pateux, "Wavefront Parallel Processing," 5th JCT-VC Meeting, Geneva, Mar. 2011 (JCTVC-E196), 9 pages.
Huang et al., "Ordered Entropy Slices for Parallel CODEC", 38. VCEG Meeting; 89. MPEG Meeting; Jul. 1-8, 2009; London, UK & Geneva, CH; (Video Coding Experts Group of ITU-T SG. 16), No. VCEG-AL25, Jul. 5, 2009, XP030003706.
Li, ""Image Compression—The Mechanics of the JPEG 2000, http://research.microsoft.com/en-us/um/people/jinl/papers_2002/ms . . . , 20 pages.
Marpe D. et al., "Context-Based Adaptive Binary Arithmetic Coding in the H.264/AVC Video Compression Standard", IEEE Transactions on Circuits and Systems for Video Technology, IEEE Service Center, Piscataway, NJ, USA, vol. 13, No. 7, Jul. 1, 2003, pp. 620-636, XP011099255.
Marpe et al., "Improved CABAC", 15. VCEG Meeting; 58; MPEG Meeting; Dec. 4-6, 2011; Pattaya, Th; (Video Coding Experts Group of ITU-T SG.16), No. VCEG-018, Nov. 28, 2001, pp. 1-6, XP030003351.
Misra and Segall, "Periodic Initialization for Wavefront Coding Functionality," 4th JCT-VC Meeting, Daegu, Jan. 2011 (JCTVC-D073), 7 pages.
Misra et al., "Lightweight slicing for entropy coding," 4th JCT-VC Meeting, Daegu, Jan. 2011 (JCTVC-D070), 7 pages.
Rissanen, J. et al "Universal Modeling and Coding", IEEE Transactions on Information Theory, vol. IT-27, No. 1, Jan. 1981, pp. 12-23.
Schwarz H. et al., CABAC and Slices 4. JVT Meeting; Jul. 22-26, 2002; Klagenfurt, Austria; (Joint Video Team of ISO/IEC MPEG & ITO/T VCEG-ISO/IEC JTC1/SC29/WG11 and ITU-T SG. 16 0.6), No. JVT-D020rl Jul. 22, 2002, pp. 1-17, XP002671680.
Sze and Budagavi, "Analysis of entropy slice approaches," 4th JCT-VC Meeting, Daegu, Jan. 2011, (JCTVC-D243), 6 pages.
Wiegand et al., "Overview of the H.264/AVC Video Coding Standard," IEEE Transactions on Circuits and Systems for Video Technology, Jul. 2003, 13(7):560-576.
Office Action issued in U.S. Appl. No. 14/128,949 on Apr. 10, 2015, 19 pages.
Office Action issued in U.S. Appl. No. 14/492,750 on Apr. 13, 2015, 17 pages.

\* cited by examiner

METHOD FOR ENCODING AND DECODING IMAGES, ENCODING AND DECODING DEVICE, AND CORRESPONDING COMPUTER PROGRAMS

CROSS-REFERENCE TO RELATED APPLICATION

This application is a divisional of U.S. application Ser. No. 14/492,750, filed on Sep. 22, 2014, which is a continuation of U.S. application Ser. No. 14/128,949, filed Apr. 21, 2014, which is a Section 371 National State Application of International Application No. PCT/FR2012/051391, filed Jun. 20, 2012, which is incorporated by reference in its entirety and published as WO 2012/175870 on Dec. 27, 2012, not in English.

FIELD OF THE INVENTION

The present invention pertains generally to the field of image processing, and more precisely to the coding and to the decoding of digital images and of sequences of digital images.

The invention can thus, in particular, be applied to video coding implemented in current video coders (MPEG, H.264, etc.) or forthcoming video coders (ITU-T/VCEG (H.265) or ISO/MPEG (HVC)).

BACKGROUND OF THE INVENTION

Current video coders (MPEG, H264, etc.) use a block-wise representation of the video sequence. The images are segmented into macro-blocks, each macro-block is itself segmented into blocks and each block, or macro-block, is coded by intra-image or inter-image prediction. Thus, certain images are coded by spatial prediction (intra prediction), while other images are coded by temporal prediction (inter prediction) with respect to one or more coded-decoded reference images, with the aid of a motion compensation known by the person skilled in the art. Moreover, for each block can be coded a residual block corresponding to the original block minus a prediction. The coefficients of this block are quantized, possibly after a transformation, and then coded by an entropy coder.

Intra prediction and inter prediction require that certain blocks which have been previously coded and decoded be available, so as to be used, either at the decoder or at the coder, to predict the current block. A schematic example of a predictive coding such as this is represented in FIG. 1, in which an image $I_N$ is divided into blocks, a current block $MB_i$ of this image being subjected to a predictive coding with respect to a predetermined number of three previously coded and decoded blocks $MBr_1$, $MBr_2$ and $MBr_3$, such as designated by the hatched arrows. The aforementioned three blocks specifically comprise the block $MBr_1$ situated immediately to the left of the current block $MB_1$, and the two blocks $MBr_2$ and $MBr_3$ situated respectively immediately above and above and to the right of the current block $MB_1$.

The entropy coder is of more particular interest here. The entropy coder encodes the information in its order of arrival. Typically a row by row traversal of the blocks is carried out, of "raster-scan" type, as illustrated in FIG. 1 by the reference PRS, starting from the block at the top left of the image. For each block, the various items of information necessary for the representation of the block (type of block, mode of prediction, residual coefficients, etc.) are dispatched sequentially to the entropy coder.

An efficient arithmetic coder of reasonable complexity, called "CABAC" ("Context Adaptive Binary Arithmetic Coder"), introduced into the AVC compression standard (also known by the name ISO-MPEG4 part 10 and ITU-T H.264) is already known.

This entropy coder implements various concepts:

arithmetic coding: the coder, such as described initially in the document J. Rissanen and G. G. Langdon Jr, "Universal modeling and coding," IEEE Trans. Inform. Theory, vol. IT-27, pp. 12-23, January 1981, uses, to code a symbol, a probability of occurrence of this symbol;

adaptation to context: here this entails adapting the probability of occurrence of the symbols to be coded. On the one hand, learning is carried out on the fly. On the other hand, depending on the state of the previously coded information, a specific context is used for the coding. To each context there corresponds an inherent probability of occurrence of the symbol. For example a context corresponds to a type of symbol coded (the representation of a coefficient of a residual, signaling of coding mode, etc.) according to a given configuration, or a state of the neighborhood (for example the number of "intra" modes selected in the neighborhood, etc.);

binarization: a shaping of a series of bits of the symbols to be coded is carried out. Subsequently, these various bits are dispatched successively to the binary entropy coder.

Thus, this entropy coder implements, for each context used, a system for learning the probabilities on the fly with respect to the symbols coded previously for the context under consideration. This learning is based on the order of coding of these symbols. Typically, the image is traversed according to an order of "raster-scan" type, described hereinabove.

During the coding of a given symbol b that may equal 0 or 1, the learning of the probability $p_i$ of occurrence of this symbol is updated for a current block MB; in the following manner:

$$p_i(b=0) = \alpha \cdot p_{i-1}(b=0) + \begin{cases} (1-\alpha) & \text{if coded bit is } 0 \\ 0 & \text{otherwise} \end{cases}$$

where $\alpha$ is a predetermined value, for example 0.95 and $p_{i-1}$ is the symbol occurrence probability calculated upon the last occurrence of this symbol.

A schematic example of such an entropy coding is represented in FIG. 1, in which a current block $MB_i$ of the image $I_N$ is subjected to an entropy coding. When the entropy coding of the block MB, begins, the symbol occurrence probabilities used are those obtained after coding of a previously coded and decoded block, which is the one which immediately precedes the current block $MB_i$ in accordance with the aforementioned row by row traversal of the blocks of "raster scan" type. Such a learning based on block to block dependency is represented in FIG. 1 for certain blocks only for the sake of clarity of the figure, by the slender arrows.

A drawback of such a type of entropy coding resides in the fact that, when coding a symbol situated at the start of a row, the probabilities used correspond mainly to those observed for the symbols situated at the end of the previous row, having regard to the "raster scan" traversal of the blocks. Now, on account of the possible spatial variation of the symbol probabilities (for example for a symbol related to an item of motion information, the motion situated on the right part of an image may be different from that observed on the left part and therefore likewise for the ensuing local probabilities), a lack of local conformity of the probabilities may be observed, thereby possibly giving rise to a loss of efficiency during coding.

To limit this phenomenon, proposals for modifications of the order of traversal of the blocks have been made, with the aim of ensuring better local consistency, but the coding and the decoding remain sequential.

Therein lies another drawback of this type of entropy coder. Indeed, the coding and the decoding of a symbol being dependent on the state of the probability learned thereto, the decoding of the symbols can only be done in the same order as that used during coding. Typically, the decoding can then only be sequential, thus preventing parallel decoding of several symbols (for example to profit from multi-core architectures).

The document: Thomas Wiegand, Gary J. Sullivan, Gisle Bjontegaard, and Ajay Luthra, "Overview of the H.264/AVC Video Coding Standard", IEEE Transactions on Circuits and Systems for Video Technology, Vol. 13, No. 7, pp. 560-576, July 2003, point out moreover that the CABAC entropy coder has the particular feature of assigning a non-integer number of bits to each symbol of a current alphabet to be coded, this being advantageous for symbol occurrence probabilities of greater than 0.5. Specifically, the CABAC coder waits until it has read several symbols, and then assigns to this set of symbols read a predetermined number of bits that the coder writes to the compressed stream to be transmitted to the decoder. Such a provision thus makes it possible to "mutualize" the bits on several symbols and to code a symbol on a fractional number of bits, this number reflecting information which is closer to the information actually transported by a symbol. Other bits associated with the symbols read are not transmitted in the compressed stream but are kept on standby while waiting to be assigned to one or more new symbols read by the CABAC coder making it possible again to mutualize these other bits. In a known manner, the entropy coder undertakes, at a given instant, an "emptying" of these untransmitted bits. Stated otherwise, at said given instant, the coder extracts the bits not yet transmitted and writes them to the compressed stream destined for the decoder. Such emptying takes place for example at the instant at which the last symbol to be coded has been read, so as to ensure that the compressed stream does indeed contain all the bits which will allow the decoder to decode all the symbols of the alphabet. In a more general manner, the instant at which the emptying is performed is determined as a function of the performance and functionalities specific to a given coder/decoder.

The document, which is available at the Internet address http://research.microsoft.com/en-us/um/people/jinl/paper_2002/msri_jpeg.htm on the date of 15 Apr. 2011, describes a method for coding still images compliant with the JPEG2000 compression standard. According to this method, the still image data undergo a discrete wavelet transform followed by a quantization, thereby making it possible to obtain quantized wavelet coefficients with which are respectively associated quantization indices. The quantization indices obtained are coded with the aid of an entropy coder. The quantized coefficients are previously grouped into rectangular blocks called code-blocks, typically 64×64 or 32×32 in size. Each code-block is thereafter coded independently by entropy coding. Thus, the entropy coder, when it undertakes the coding of a current code-block, does not use the symbol occurrence probabilities calculated during the coding of previous code-blocks. The entropy coder is therefore in an initialized state at each start of coding of a code-block. Such a method exhibits the advantage of decoding the data of a code-block without having to decode the neighboring code-blocks. Thus for example, a piece of client software may request a piece of server software to provide the compressed code-blocks needed solely by the client to decode an identified sub-part of an image. Such a method also presents the advantage of permitting the parallel encoding and/or decoding of the code-blocks. Thus, the smaller the size of the code-blocks, the higher the level of parallelism. For example, for a level of parallelism fixed at two, two code-blocks will be coded and/or decoded in parallel. In theory, the value of the level of parallelism is equal to the number of code-blocks to be coded of the image. However, the compression performance obtained with this method is not optimal having regard to the fact that such coding does not exploit the probabilities arising from the immediate environment of the current code-block.

SUMMARY OF THE INVENTION

A subject of the present invention relates to a method for coding at least one image comprising the steps of:
  segmenting the image into a plurality of blocks able to contain symbols belonging to a predetermined set of symbols,
  grouping of blocks into a predetermined number of subsets of blocks,
  coding, by means of an entropy coding module, of each of the subsets of blocks, by associating digital information with the symbols of each block of a subset under consideration, the coding step comprising, for the first block of the image, a sub-step of initializing state variables of the entropy coding module,
  generation of at least one data sub-stream representative of at least one of the coded subsets of blocks.

The method according to the invention is noteworthy in that:
  in the case where the current block is the first block to be coded of a subset under consideration, there is undertaken the determination of probabilities of symbol occurrence for the first current block, the probabilities being those which have been determined for a coded and decoded predetermined block of at least one other subset,
  in the case where the current block is the last coded block of the subset under consideration there is undertaken:
    the writing, to the sub-stream representative of the subset under consideration, of the entirety of the digital information which has been associated with the symbols during the coding of the blocks of the subset under consideration,
    the implementation of the initialization sub-step.

The writing step mentioned hereinabove amounts to performing, as soon as the last block of a subset of blocks has been coded, an emptying of the digital information (bits) not yet transmitted, as was explained above in the description.

The coupling of the aforementioned writing step and of the step of reinitializing the entropy coding module makes it possible to produce a coded data stream containing various data sub-streams corresponding respectively to at least one coded subset of blocks, said stream being adapted for being decoded in parallel according to various levels of parallelism, and this independently of the type of coding, sequential or parallel, which has been applied to the subsets of blocks. Thus, a large degree of freedom can be obtained on decoding regarding the choice of the level of parallelism, as a function of the coding/decoding performance expected. The level of parallelism on decoding is variable and can even be different from the level of parallelism on coding, since when commencing the decoding of a subset of blocks, the decoder is always in an initialized state.

According to a first example, the state variables of the entropy coding module are the two bounds of an interval representative of the probability of occurrence of a symbol from among the symbols of the predetermined set of symbols.

According to a second example, the state variables of the entropy coding module are the strings of symbols contained in the translation table of an LZW (Lempel-Ziv-Welch) entropy coder, well known to the person skilled in the art, and described at the following Internet address on the date of 21 Jun. 2011: http://en.wikipedia.org/wiki/Lempel%E2%80%93Ziv%E2%80%93Welch.

The main advantage of using the symbol occurrence probabilities determined for the first block of said other subset during the entropy coding of the first current block of a considered subset of blocks is to economize on the buffer memory of the coder by storing in the latter solely the updating of said symbol occurrence probabilities, without taking into account the symbol occurrence probabilities learned by the other consecutive blocks of said other subset.

The main advantage of using the symbol occurrence probabilities determined for a block of said other subset, other than the first block, for example the second block, during the entropy coding of the first current block of a considered subset of blocks is the obtaining of more precise and therefore better learning of the probabilities of occurrence of symbols, thereby giving rise to better video compression performance.

In a particular embodiment, the subsets of blocks are coded sequentially or else in parallel.

The fact that the subsets of blocks are coded sequentially has the advantage of rendering the coding method according to the invention compliant with the H.264/MPEG-4 AVC standard.

The fact that the subsets of blocks are coded in parallel has the advantage of accelerating the coder processing time and of benefiting from a multiplatform architecture for the coding of an image.

In another particular embodiment, when at least two subsets of blocks are coded in parallel with at least one other subset of blocks, the at least two coded subsets of blocks are contained in the same data sub-stream.

Such a provision makes it possible in particular to economize on the signaling of the data sub-streams. Indeed, so that a decoding unit can decode a sub-stream as early as possible, it is necessary to indicate in the compressed file the point at which the sub-stream in question begins. When several subsets of blocks are contained in the same data sub-stream, a single indicator is necessary, thereby reducing the size of the compressed file.

In yet another particular embodiment, when the coded subsets of blocks are intended to be decoded in parallel in a predetermined order, the data sub-streams delivered after coding respectively of each of the subsets of blocks are first ordered according to the predetermined order before being transmitted with a view to their decoding.

Such a provision makes it possible to adapt the coded data stream to a specific type of decoding without needing to decode and then re-encode the image.

Correlatively, the invention relates further to a device for coding at least one image comprising:
  means for segmenting the image into a plurality of blocks able to contain symbols belonging to a predetermined set of symbols,
  means for grouping the blocks into a predetermined number of subsets of blocks,
  means for coding each of the subsets of blocks, the coding means comprising an entropy coding module able to associate digital information with the symbols of each block of a subset under consideration, the coding means comprising, for the first block of the image, sub-means for initializing state variables of the entropy coding module,
  means for generating at least one data sub-stream representative of at least one of the coded subsets of blocks.

Such a coding device is noteworthy in that it comprises:
  means for determining probabilities of symbol occurrence for a current block which, in the case where the current block is the first block to be coded of a subset under consideration, determine the probabilities of symbol occurrence for the first block as being those which have been determined for a coded and decoded predetermined block of at least one other subset,
  writing means which, in the case where the current block is the last coded block of the subset under consideration, are activated to write, to the sub-stream representative of the subset under consideration, the entirety of the digital information which has been associated with the symbols during the coding of the blocks of the subset under consideration, the initialization sub-means being furthermore activated to reinitialize the state variables of the entropy coding module.

In a corresponding manner, the invention also relates to a method for decoding a stream representative of at least one coded image, comprising the steps of:
  identification in the stream of a predetermined number of data sub-streams corresponding respectively to at least one subset of blocks to be decoded, the blocks being able to contain symbols belonging to a predetermined set of symbols,
  decoding of the identified subsets of blocks by means of an entropy decoding module, by reading, in at least one of the identified sub-streams, digital information associated with the symbols of each block of the subset corresponding to said at least one identified sub-stream, the decoding step comprising, for the first block to be decoded of the image, a sub-step of initializing state variables of the entropy decoding module.

Such a decoding method is noteworthy in that:
  in the case where the current block is the first block to be decoded of a subset under consideration, there is undertaken the determination of probabilities of symbol occurrence for the first block of the subset under consideration, the probabilities being those which have been determined for a decoded predetermined block of at least one other subset,
  in the case where the current block is the last decoded block of the subset under consideration, there is undertaken the implementation of the initialization sub-step.

In a particular embodiment, the subsets of blocks are decoded sequentially or else in parallel.

In another particular embodiment, when at least two subsets of blocks are decoded in parallel with at least one other subset of blocks, one of the identified data sub-streams is representative of the at least two subsets of blocks.

In yet another particular embodiment, when the coded subsets of blocks are intended to be decoded in parallel in a predetermined order, the data sub-streams corresponding respectively to the coded subsets of blocks are previously ordered in said predetermined order in said stream to be decoded.

Correlatively, the invention further relates to a device for decoding a stream representative of at least one coded image, comprising:

means for identification in the stream of a predetermined number of data sub-streams corresponding respectively to at least one subset of blocks to be decoded, the blocks being able to contain symbols belonging to a predetermined set of symbols, means for decoding the subsets of blocks identified, the decoding means comprising an entropy decoding module able to read, in at least one of the identified sub-streams, digital information associated with the symbols of each block of the subset corresponding to said at least one identified sub-stream, the decoding means comprising, for the first block to be decoded of the image, sub-means for initializing state variables of the entropy decoding module.

Such a decoding device is noteworthy in that it comprises means for determining probabilities of symbol occurrence for a current block which, in the case where the current block is the first block to be decoded of a subset under consideration, determine the probabilities of symbol occurrence for the first block as being those which have been determined for a decoded predetermined block of at least one other subset, and in that in the case where the current block is the last decoded block of the subset under consideration, the initialization sub-means are activated to reinitialize the state variables of the entropy decoding module.

The invention is also aimed at a computer program comprising instructions for the execution of the steps of the coding or decoding method hereinabove, when the program is executed by a computer.

Such a program can use any programming language, and be in the form of source code, object code, or of code intermediate between source code and object code, such as in a partially compiled form, or in any other desirable form.

Yet another subject of the invention is also aimed at a recording medium readable by a computer, and comprising computer program instructions such as mentioned hereinabove.

The recording medium can be any entity or device capable of storing the program. For example, such a medium can comprise a storage means, such as a ROM, for example a CD ROM or a microelectronic circuit ROM, or else a magnetic recording means, for example a diskette (floppy disk) or a hard disk.

Moreover, such a recording medium can be a transmissible medium such as an electrical or optical signal, which can be conveyed via an electrical or optical cable, by radio or by other means. The program according to the invention can in particular be downloaded from a network of Internet type.

Alternatively, such a recording medium can be an integrated circuit in which the program is incorporated, the circuit being adapted for executing the method in question or to be used in the execution of the latter.

The coding device, the decoding method, the decoding device and the computer programs aforementioned exhibit at least the same advantages as those conferred by the coding method according to the present invention.

BRIEF DESCRIPTION OF THE DRAWINGS

Other characteristics and advantages will become apparent on reading two preferred embodiments described with reference to the figures in which.

DETAILED DESCRIPTION OF ILLUSTRATIVE EMBODIMENTS

A First Embodiment of the Coding Part

An embodiment of the invention will now be described, in which the coding method according to the invention is used to code a sequence of images according to a binary stream much like that obtained by a coding according to the H.264/MPEG-4 AVC standard. In this embodiment, the coding method according to the invention is for example implemented in a software or hardware manner by modifications of a coder initially compliant with the H.264/MPEG-4 AVC standard. The coding method according to the invention is represented in the form of an algorithm comprising steps C1 to C5, represented in FIG. 2A.

Figure 3A:
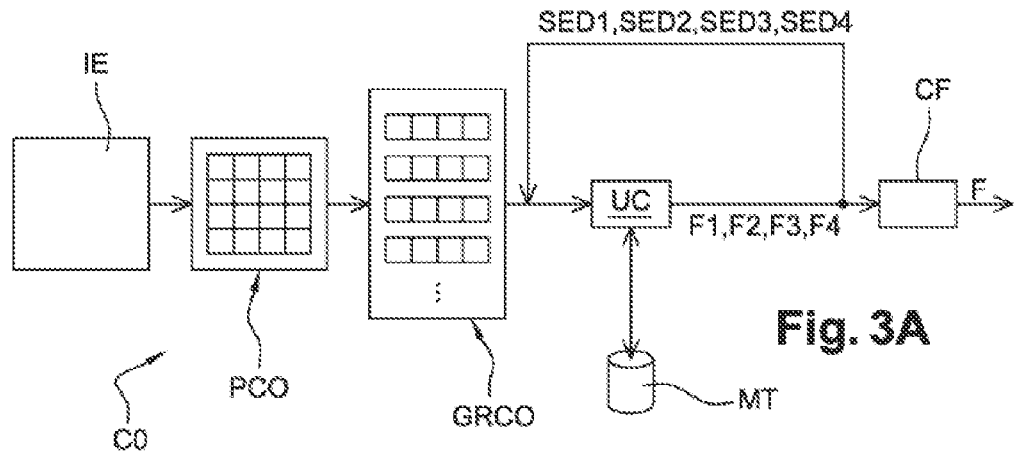
FIG. 3A represents a first embodiment of a coding device according to the invention.
Figure 3B:
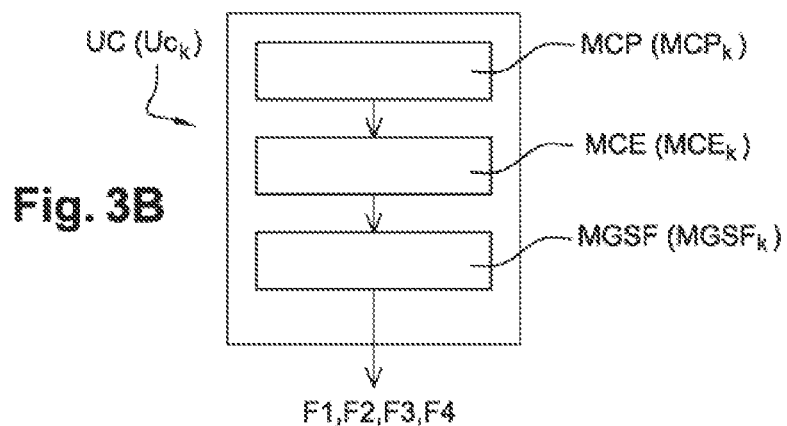
FIG. 3B represents a coding unit of the coding device of FIG. 3A.
Figure 3C:
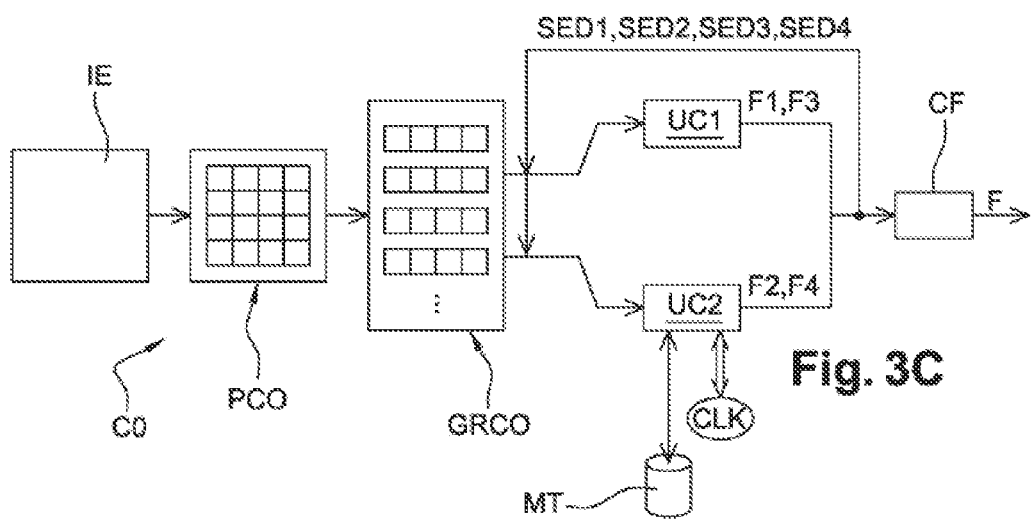
FIG. 3C represents a second embodiment of a coding device according to the invention.

According to the embodiment of the invention, the coding method according to the invention is implemented in a coding device CO, two embodiments of which are represented respectively in FIGS. 3A and 3C.

Figure 1:
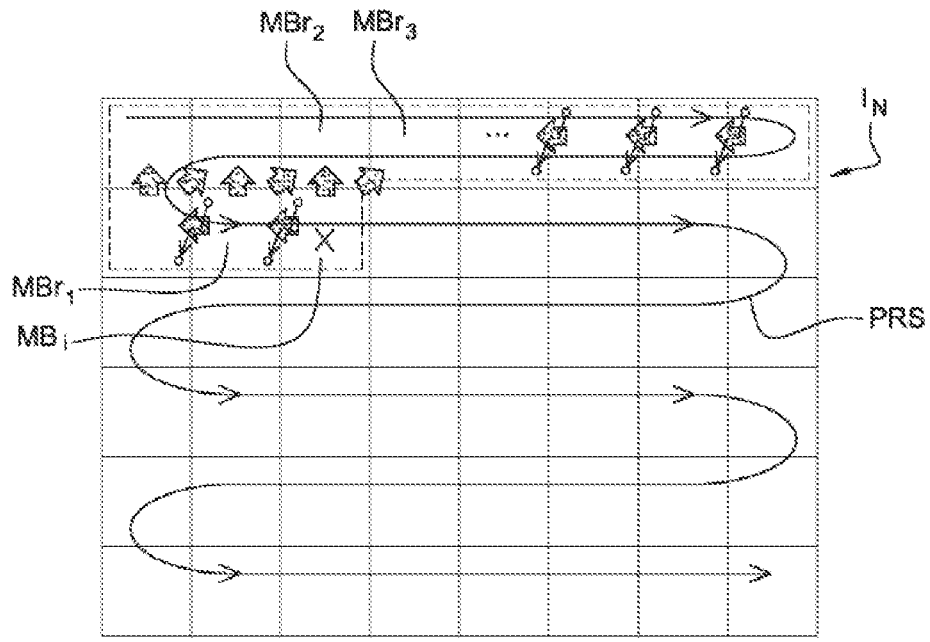
FIG. 1 represents an image coding diagram of the prior art.
Figure 2A:
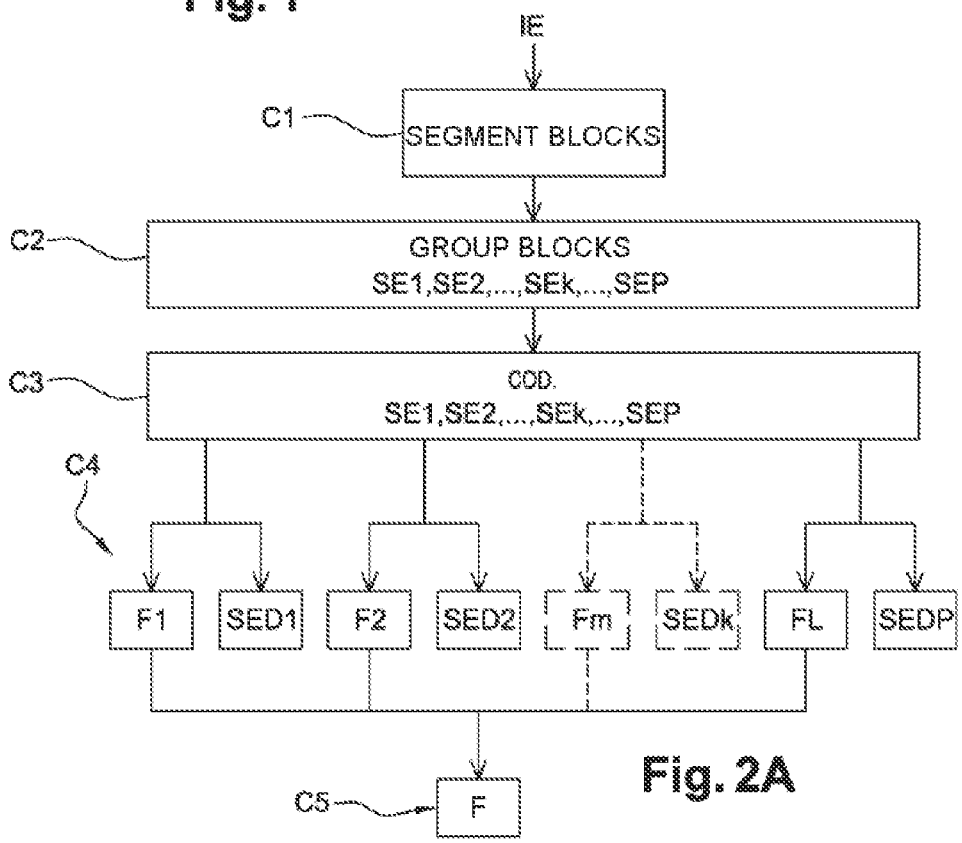
FIG. 2A represents the main steps of the coding method according to the invention.
Figure 4A:
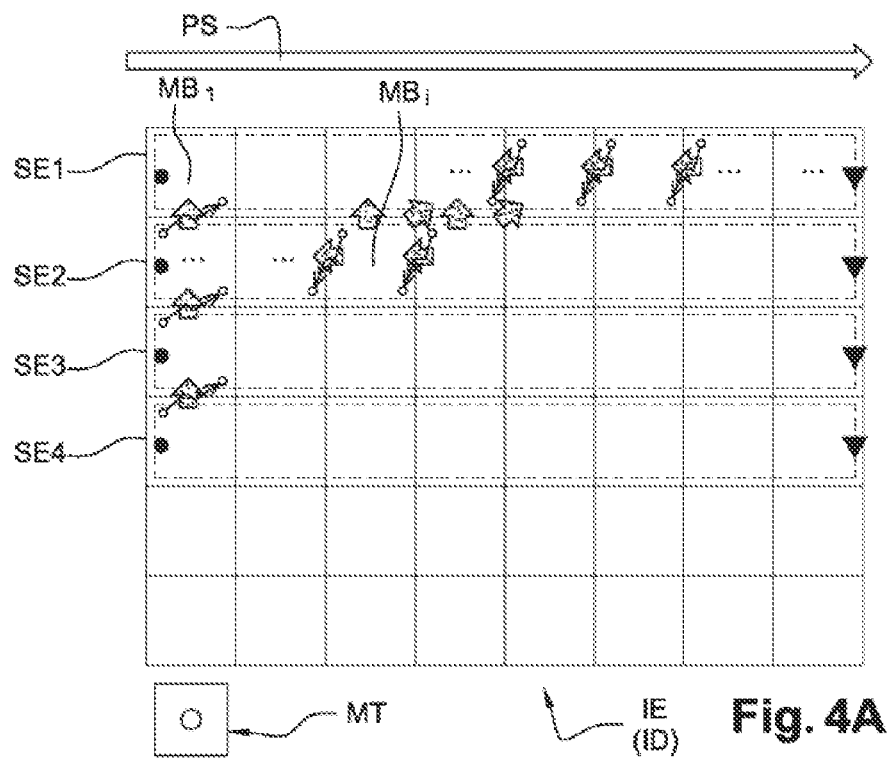
FIG. 4A represents an image coding/decoding diagram according to a first preferential embodiment.
Figure 4B:
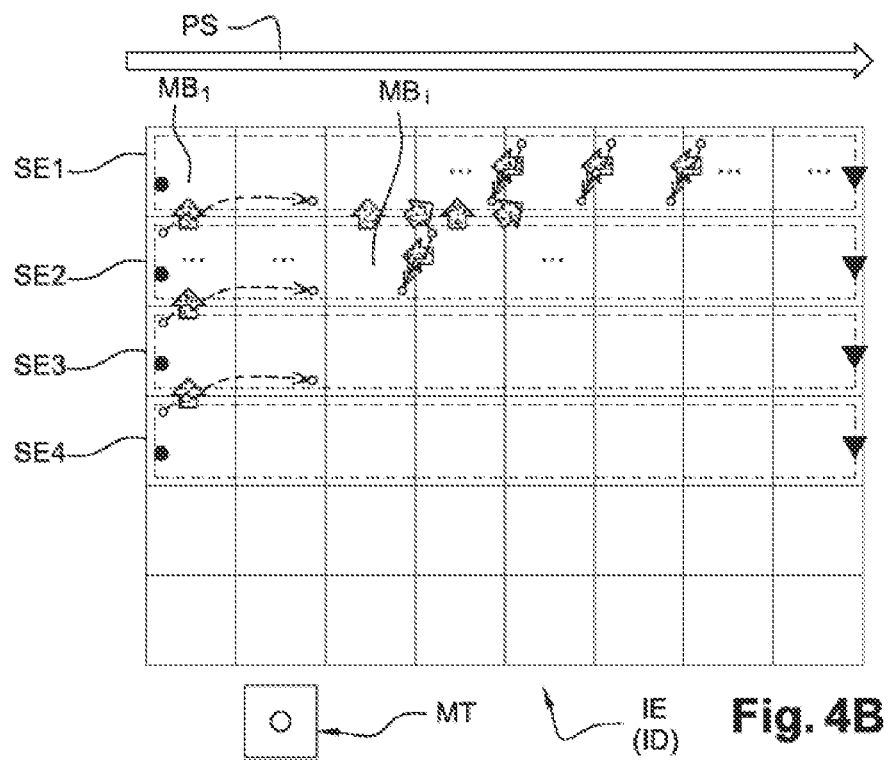
FIG. 4B represents an image coding/decoding diagram according to a second preferential embodiment.

With reference to FIG. 2A, the first coding step C1 is the segmenting of an image IE of a sequence of images to be coded into a plurality of blocks or macro-blocks MB, as represented in FIG. 4A or 4B. Said macro-blocks are able to contain one or more symbols, said symbols forming part of a predetermined set of symbols. In the examples represented, said blocks MB have a square shape and all have the same size. As a function of the size of the image which is not necessarily a multiple of the size of the blocks, the last blocks on the left and the last blocks at the bottom may not be square. In an alternative embodiment, the blocks can be for example of rectangular size and/or not aligned with one another.

Each block or macroblock can moreover itself be divided into sub-blocks which are themselves subdividable.

Such a segmenting is performed by a partitioning module PCO represented in FIG. 3A which uses for example a partitioning algorithm well known as such.

With reference to FIG. 2A, the second coding step C2 is the grouping of the aforementioned blocks into a predetermined number P of subsets of consecutive blocks SE1, SE2, ..., SEk, ..., SEP intended to be coded sequentially or in parallel. In the examples represented in FIGS. 4A and 4B, P=6, but only four subsets SE1, SE2, SE3, SE4 are represented for the sake of clarity of the figures. These four subsets of blocks are each represented dashed and consist respectively of the first four rows of blocks of the image IE.

Such a grouping is performed by a calculation module GRCO represented in FIG. 3A, with the aid of an algorithm well known per se.

With reference to FIG. 2A, the third coding step C3 consists in the coding of each of said subsets of blocks SE1 to SE6, the blocks of a subset under consideration being coded according to a predetermined order of traversal PS, which is for example of sequential type. In the examples represented in FIGS. 4A and 4B, the blocks of a current subset SEk ($1 \leq k \leq P$) are coded one after another, from left to right, as indicated by the arrow PS.

According to a first variant, such a coding is of the sequential type and is implemented by a single coding unit UC such as represented in FIG. 3A. In a manner known per se, the coder CO comprises a buffer memory MT which is adapted to contain the symbols occurrence probabilities such as progressively re-updated in tandem with the coding of a current block.

As represented in greater detail in FIG. 3B, the coding unit UC comprises:
- a module for predictive coding of a current block with respect to at least one previously coded and decoded block, denoted MCP;
- a module for entropy coding of said current block by use of at least one probability of symbol occurrence calculated for said previously coded and decoded block, denoted MCE.

The predictive coding module MCP is a software module which is able to perform a predictive coding of the current block, according to conventional prediction techniques, such as for example in Intra and/or Inter mode.

The entropy coding module MCE is for its part of CABAC type, but modified according to the present invention, as will be described further on in the description.

As a variant, the entropy coding module MCE could be a Huffman coder known per se.

In the examples represented in FIGS. 4A and 4B, the unit UC codes the blocks of the first row SE1, from left to right. When it reaches the last block of the first row SE1, it passes to the first block of the second row SE2. When it reaches the last block of the second row SE2, it passes to the first block of the third row SE3. When it reaches the last block of the third row SE3, it passes to the first block of the fourth row SE4, and so on and so forth until the last block of the image IE is coded.

Other types of traversal than that which has just been described hereinabove are of course possible. Thus, it is possible to segment the image IE into several sub-images and to apply a segmenting of this type to each sub-image independently. It is also possible for the coding unit to process not a succession of rows, as explained hereinabove, but a succession of columns. It is also possible to traverse the rows or columns in either direction.

According to a second variant, such a coding is of the parallel type and is distinguished from the first variant of sequential coding, solely by the fact that it is implemented by a predetermined number R of coding units UCk ($1 \leq k \leq R$), with R=2 in the example represented in FIG. 3C. Such parallel coding is known to engender a substantial acceleration of the coding method.

Each of the coding units UCk is identical to the coding unit UC represented in FIG. 3B. In a corresponding manner, a coding unit UCk comprises a predictive coding module MCPk and an entropy coding module MCEk.

Again with reference to FIGS. 4A and 4B, the first unit UC1 codes for example the blocks of the rows of odd rank, while the second unit UC2 codes for example the blocks of the rows of even rank. More precisely, the first unit UC1 codes the blocks of the first row SE1, from left to right. When it reaches the last block of the first row SE1, it passes to the first block of the $(2n+1)^{th}$ row, that is to say the third row SE3, etc. In parallel with the processing performed by the first unit UC1, the second unit UC2 codes the blocks of the second row SE2, from left to right. When it reaches the last block of the second row SE2, it passes to the first block of the $(2n)^{th}$ row, here the fourth row SE4, etc. The aforementioned two traversals are repeated until the last block of the image IE is coded.

With reference to FIG. 2A, the fourth coding step C4 is the production of L sub-streams F1, F2, ..., Fm, ..., FL ($1 \leq m \leq L \leq P$) of bits representing the processed blocks compressed by the aforementioned coding unit UC or each of the aforementioned coding units UCk, as well as a decoded version of the processed blocks of each subset SEk. The decoded processed blocks, denoted SED1, SED2, ..., SEDk, ..., SEDP, of a subset under consideration may be reused by the coding unit UC represented in FIG. 3A or each of the coding units UCk represented in FIG. 3C, according to a synchronization mechanism which will be detailed further on in the description.

With reference to FIG. 3B, the step of producing L sub-streams is implemented by a stream generating software module MGSF or MGSFk which is adapted for producing data streams, such as bits for example.

With reference to FIG. 2A, the fifth coding step C5 consists in constructing a global stream F on the basis of the aforementioned L sub-streams F1, F2, ..., Fm, ..., FL. According to one embodiment, the sub-streams F1, F2, ..., Fm, ..., FL are simply juxtaposed, with an extra item of information intended to indicate to the decoder the location of each sub-stream Fm in the global stream F. The latter is thereafter transmitted by a communication network (not represented), to a remote terminal. The latter comprises the decoder DO represented in FIG. 5A. According to another embodiment, which is particularly advantageous since it does not require a decoding and then a re-encoding of the image, the coder CO, before transmitting the stream F to the decoder DO, previously orders the L sub-streams F1, F2, ..., Fm, ..., FL in a predetermined order which corresponds to the order in which the decoder DO is able to decode the sub-streams.

Thus, as will be described in detail further on in the description, the decoder according to the invention is able to isolate the sub-streams F1, F2, ..., Fm, ..., FL within the global stream F and to assign them to one or more decoding units of which the decoder is composed. It will be noted that such a decomposition of the sub-streams in a global stream is independent of the choice of the use of a single coding unit or else of several coding units operating in parallel, and that it is possible with this approach to have solely the coder or solely the decoder which comprises units operating in parallel.

Such a construction of the global stream F is implemented in a stream construction module CF, such as represented in FIG. 3A and FIG. 3C.

The various specific sub-steps of the invention, such as are implemented during the aforementioned step C3 of coding, in a coding unit UC or UCk, will now be described with reference to FIG. 2B.

In the course of a step C31, the coding unit UC or UCk selects as current block the first block to be coded of a current row SEk represented in FIG. 4A or 4B, such as for example the first row SE1.

In the course of a step C32, the unit UC or UCk tests whether the current block is the first block (situated at the top and on the left) of the image IE which has been segmented into blocks in the aforementioned step C1.

If such is the case, in the course of a step C33, the entropy coding module MCE or MCEk undertakes an initialization of its state variables. According to the example represented, which uses the arithmetic coding described previously, this entails an initialization of an interval representative of the probability of occurrence of a symbol contained in the predetermined set of symbols. In a manner known per se, this interval is initialized with two bounds L and H, respectively lower and upper. The value of the lower bound L is fixed at 0, while the value of the upper bound is fixed at 1, thereby corresponding to the probability of occurrence of a first symbol from among all the symbols of the predetermined set of symbols. The size R of this interval is therefore defined at this juncture by R=H−L=1. The initialized interval is furthermore partitioned conventionally into a plurality of predetermined sub-intervals which are representative respectively of the probabilities of occurrence of the symbols of the predetermined set of symbols.

As a variant, if the entropy coding used is the LZW coding, a translation table of strings of symbols is initialized, so that it contains all the possible symbols once and only once.

If subsequent to the aforementioned step C32, the current block is not the first block of the image IE, there is undertaken, in the course of a step C40 which will be described later in the subsequent description, the determination of the availability of the necessary previously coded and decoded blocks.

In the course of a step C34, there is undertaken the coding of the first current block MB1 of the first row SE1 represented in FIG. 4A or 4B. Such a step C34 comprises a plurality of sub-steps C341 to C348 which will be described hereinbelow.

Figure 2B:
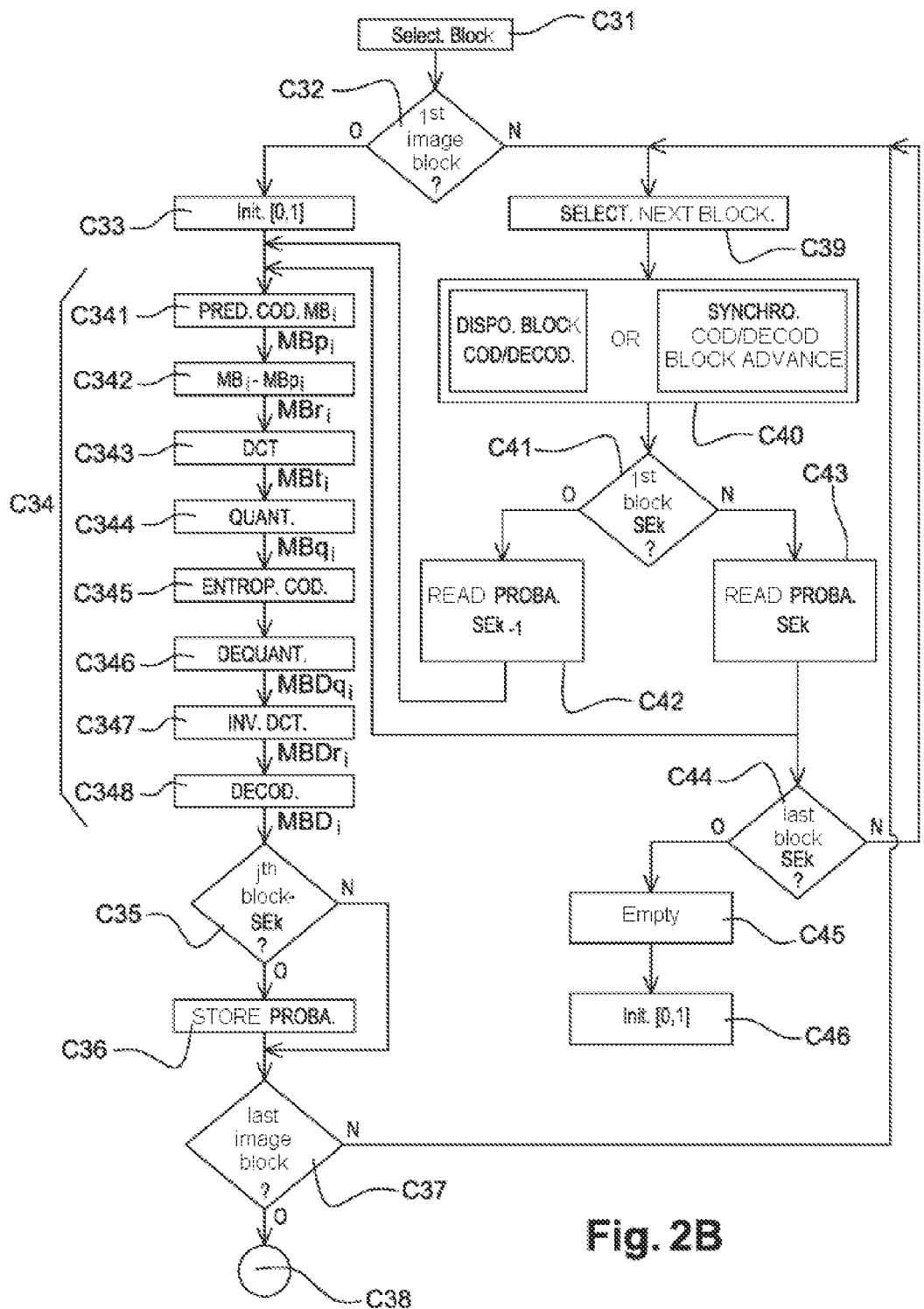
FIG. 2B represents in detail the coding implemented in the coding method of FIG. 2A.

In the course of a first sub-step C341 represented in FIG. 2B, there is undertaken the predictive coding of the current block MB1 by known techniques of intra and/or inter prediction, in the course of which the block MB1 is predicted with respect to at least one previously coded and decoded block.

It goes without saying that other modes of intra prediction such as proposed in the H.264 standard are possible.

The current block MB1 can also be subjected to a predictive coding in inter mode, in the course of which the current block is predicted with respect to a block arising from a previously coded and decoded image. Other types of prediction are of course conceivable. Among the possible predictions for a current block, the optimal prediction is chosen according to a bitrate distortion criterion well known to the person skilled in the art.

Said aforementioned predictive coding step makes it possible to construct a predicted block $MBp_1$ which is an approximation of the current block $MB_1$. The information relating to this predictive coding will subsequently be written to the stream F transmitted to the decoder DO. Such information comprises in particular the type of prediction (inter or intra), and if appropriate, the mode of intra prediction, the type of partitioning of a block or macroblock if the latter has been subdivided, the reference image index and the displacement vector used in the inter prediction mode. This information is compressed by the coder CO.

In the course of a following sub-step C342, there is undertaken the subtraction of the predicted block $MBp_1$ from the current block $MB_1$ to produce a residual block $MBr_1$.

In the course of a following sub-step C343, there is undertaken the transformation of the residual block $MBr_1$ according to a conventional direct transformation operation such as for example a discrete cosine transformation of DCT type, to produce a transformed block $MBt_1$.

In the course of a following sub-step C344, there is undertaken the quantization of the transformed block $MBt_1$ according to a conventional quantization operation, such as for example a scalar quantization. A block of quantized coefficients $MBq_1$ is then obtained.

In the course of a following sub-step C345, there is undertaken the entropy coding of the block of quantized coefficients $MBq_1$. In the preferred embodiment, this entails a CABAC entropy coding. Such a step consists in:
  a) reading the symbol or symbols of the predetermined set of symbols which are associated with said current block,
  b) associating digital information, such as bits, with the symbol(s) read.

In the aforementioned variant according to which the coding used is an LZW coding, a digital item of information corresponding to the code of the symbol in the current translation table is associated with the symbol to be coded, and an update of the translation table is performed, according to a procedure known per se.

In the course of a following sub-step C346, there is undertaken the de-quantization of the block $MBq_1$ according to a conventional de-quantization operation, which is the operation inverse to the quantization performed in step C344. A block of de-quantized coefficients $MBDq_1$ is then obtained.

In the course of a following sub-step C347, there is undertaken the inverse transformation of the block of de-quantized coefficients $MBDq_1$ which is the operation inverse to the direct transformation performed in step C343 hereinabove. A decoded residual block $MBDr_1$ is then obtained.

In the course of a following sub-step C348, there is undertaken the construction of the decoded block $MBD_1$ by adding to predicted block $MBp_1$ the decoded residual block $MBDr_1$. It should be noted that the latter block is the same as the decoded block obtained on completion of the method for decoding the image IE, which will be described further on in the description. The decoded block $MBD_1$ is thus rendered available to be used by the coding unit UCk or any other coding unit forming part of the predetermined number R of coding units.

On completion of the aforementioned coding step C34, the entropy coding module MCE or MCEk such as represented in FIG. 3B contains all the probabilities such as progressively re-updated in tandem with the coding of the first block. These probabilities correspond to the various elements of possible syntaxes and to the various associated coding contexts.

Subsequent to the aforementioned coding step C34, a test is performed, in the course of a step C35, to determine whether the current block is the jth block of this same row, where j is a predetermined value known to the coder CO which is at least equal to 1.

If such is the case, in the course of a step C36 represented in FIG. 2B, the set of probabilities calculated for the jth block is stored in the buffer memory MT of the coder CO such as represented in FIG. 3A or 3B and in FIGS. 4A and 4B, the size of said memory being adapted for storing the calculated number of probabilities.

In the course of a step C37 represented in FIG. 2B, the coding unit UC or UCk tests whether the current block of the row SEk which has just been coded is the last block of the image IE. Such a step is also implemented if in the course of step C35, the current block is not the jth block of the row SE1.

If the current block is the last block of the image IE, in the course of a step C38, the coding method is terminated.

If such is not the case, there is undertaken, in the course of step C39, the selection of the next block $MB_i$ to be coded in accordance with the order of traversal represented by the arrow PS in FIG. 4A or 4B.

In the course of a step C40 represented in FIG. 2B, there is undertaken the determination of the availability of previously coded and decoded blocks which are necessary for coding the current block MR.

If this is the first row SE1, such a step consists in verifying the availability of at least one block situated on the left of the current block to be coded $MB_i$. However, having regard to the order of traversal PS chosen in the embodiment represented in FIG. 4A or 4B, the blocks are coded one after the other over a row SEk under consideration. Consequently, the left coded and decoded block is always available (with the exception of the first block of a row). In the example represented in FIG. 4A or 4B, this is the block situated immediately to the left of the current block to be coded.

If this is a different row SEk from the first row, said determination step furthermore consists in verifying whether a predetermined number N' of blocks situated in the previous row SEk−1, for example the two blocks situated respectively above and above and to the right of the current block, are available for the coding of the current block, that is to say if they have already been coded and then decoded by the coding unit UC or UCk−1.

As this test step is apt to slow down the coding method, in an alternative manner in accordance with the invention, in the case where the coding of the rows is of parallel type, a clock CLK represented in FIG. 3C is adapted to synchronize the advance of the coding of the blocks so as to guarantee the availability of the two blocks situated respectively above and above and to the right of the current block, without it being necessary to verify the availability of these two blocks. Thus, a coding unit UCk always begins to code the first block with a shift of a predetermined number N' (with for example N'=2) of coded and decoded blocks of the previous row SEk−1 which are used for the coding of the current block. From a software point of view, the implementation of such a clock makes it possible to noticeably accelerate the time to process the blocks of the image IE in the coder CO.

In the course of a step C41 represented in FIG. 2B, a test is performed to determine whether the current block is the first block of the row SEk under consideration.

If such is the case, in the course of a step C42, there is undertaken the reading in the buffer memory MT solely of the symbol occurrence probabilities calculated during the coding of the jth block of the previous row SEk−1.

According to a first variant represented in FIG. 4A, the jth block is the first block of the previous row SEk−1 (j=1). Such a reading consists in replacing the probabilities of the CABAC coder with those present in the buffer memory MT. Entailing as it does the respective first blocks of the second, third and fourth rows SE2, SE3 and SE4, this reading step is depicted in FIG. 4A by the arrows represented by slender lines.

According to a second variant of the aforementioned step C43 which is illustrated in FIG. 4B, the jth block is the second block of the previous row SEk−1 (j=2). Such a reading consists in replacing the probabilities of the CABAC coder with those present in the buffer memory MT. Entailing as it does the respective first blocks of the second, third and fourth rows SE2, SE3 and SE4, this reading step is depicted in FIG. 4B by the arrows represented by slender dashed lines.

Subsequent to step C42, the current block is coded and then decoded by repetition of steps C34 to C38 described above.

If subsequent to the aforementioned step C41, the current block is not the first block of the row SEk under consideration, there is advantageously not undertaken the reading of the probabilities arising from the previously coded and decoded block which is situated in the same row SEk, that is to say the coded and decoded block situated immediately to the left of the current block, in the example represented. Indeed, having regard to the sequential traversal PS for reading the blocks situated in the same row, as represented in FIG. 4A or 4B, the symbol occurrence probabilities present in the CABAC coder at the moment of beginning the coding of the current block are exactly those which are present after coding/decoding of the previous block in this same row. Consequently, in the course of a step C43 represented in FIG. 2B, there is undertaken the learning of the probabilities of symbol occurrence for the entropy coding of said current block, these corresponding solely to those which have been calculated for said previous block in the same row, as represented by the double solid arrows in FIG. 4A or 4B.

Subsequent to step C43, the current block is coded and then decoded by repetition of steps C34 to C38 described above.

A test is performed thereafter, in the course of a step C44, to determine whether the current block is the last block of the row SEk under consideration.

If this is not the case, subsequent to step C44, step C39 of selecting the next block $MB_i$ to be coded is implemented again.

If the current block is the last block of the row SEk under consideration, in the course of a step C45, the coding device CO of FIG. 3A or 3C performs an emptying as mentioned above in the description. For this purpose, the coding unit UCk transmits to the corresponding sub-stream generating module MGSFk the entirety of the bits which have been associated with the symbol(s) read during the coding of each block of said row SEk under consideration, in such a way that the module MGSFk writes, to the data sub-stream Fm containing a binary train representative of the coded blocks of said row SEk under consideration, said entirety of bits. Such an emptying is symbolized in FIGS. 4A and 4B by a triangle at the end of each row SEk.

In the course of a step C46 represented in FIG. 2B, the coding unit UC or UCk performs a step identical to the aforementioned step C33, that is to say again initializes the interval representative of the probability of occurrence of a symbol contained in the predetermined set of symbols. Such a reinitialization is depicted in FIGS. 4A and 4B by a black dot at the start of each row SEk.

The benefit of performing steps C45 and C46 at this level of the coding is that during the coding of the next block processed by the coding unit UC or a coding unit UCk, the coder CO is in an initialized state. Thus, as will be described further on in the description, it becomes possible for a decoding unit working in parallel to directly decode the compressed stream F from this point, since it suffices for it to be in the initialized state.

An Embodiment of the Decoding Part

An embodiment of the decoding method according to the invention will now be described, in which the decoding method is implemented in a software or hardware manner by modifications of a decoder initially compliant with the H.264/MPEG-4 AVC standard.

Figure 5A:
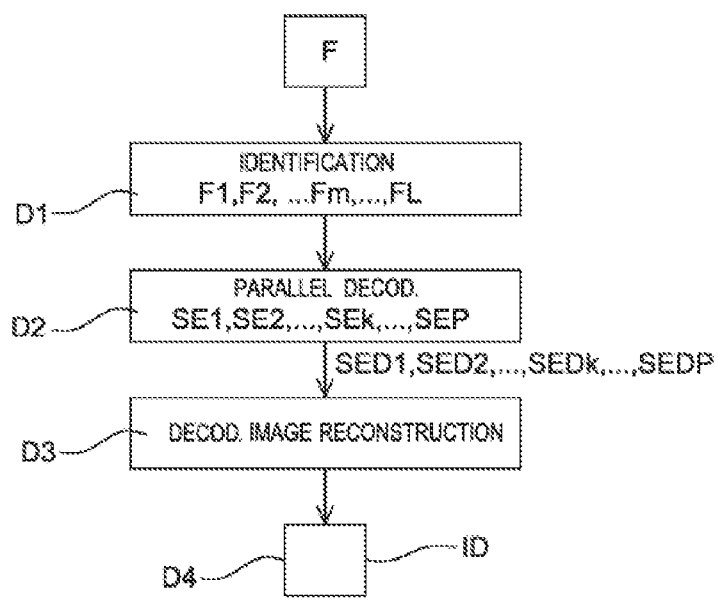
FIG. 5A represents the main steps of the decoding method according to the invention.

The decoding method according to the invention is represented in the form of an algorithm comprising steps D1 to D4, represented in FIG. 5A.

Figure 6A:
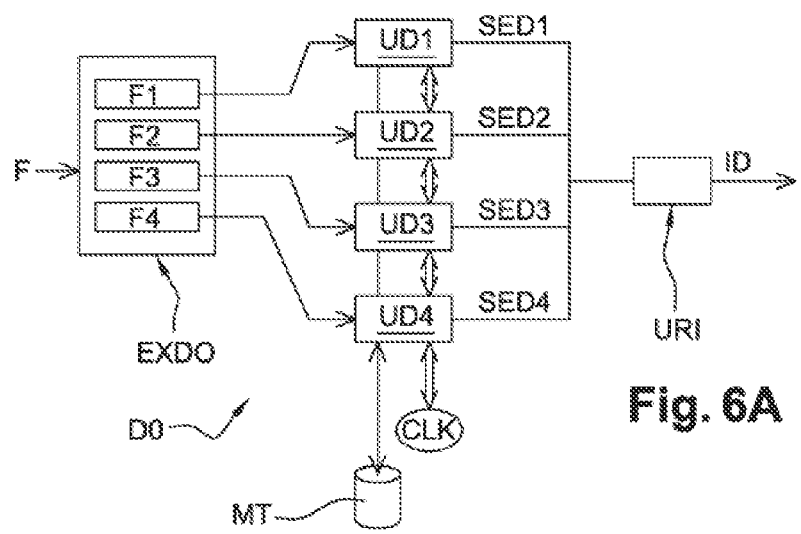
FIG. 6A represents an embodiment of a decoding device according to the invention.

According to the embodiment of the invention, the decoding method according to the invention is implemented in a decoding device DO represented in FIG. 6A.

With reference to FIG. 5A, the first decoding step D1 is the identification in said stream F of the L sub-streams F1, F2, ..., Fm, ..., FL containing respectively the P subsets SE1, SE2, ..., SEk, ..., SEP of previously coded blocks or macro-blocks MB, as represented in FIG. 4A or 4B. For this purpose, each sub-stream Fm in the stream F is associated with an indicator intended to allow the decoder DO to determine the location of each sub-stream Fm in the stream F. As a variant, on completion of the aforementioned coding step C3, the coder CO orders the sub-streams F1, F2, ..., Fm, ..., FL in the stream F, in the order expected by the decoder DO, thereby avoiding the insertion into the stream F of the sub-stream indicators. Such a provision thus makes it possible to reduce the cost in terms of bitrate of the data stream F.

In the example represented in FIG. 4A or 4B, said blocks MB have a square shape and all have the same size. Depending on the size of the image which is not necessarily a multiple of the size of the blocks, the last blocks on the left and the last blocks at the bottom may not be square. In an alternative embodiment, the blocks can be for example of rectangular size and/or not aligned with one another.

Each block or macroblock can moreover itself be divided into sub-blocks which are themselves subdividable.

Such an identification is performed by a stream extraction module EXDO such as represented in FIG. 6A.

In the example represented in FIG. 4A or 4B, the predetermined number P is equal to 6 but only four subsets SE1, SE2, SE3, SE4 are represented dashed, for the sake of clarity of the figures.

With reference to FIG. 5A, the second decoding step C2 is the decoding of each of said subsets of blocks SE1, SE2, SE3 and SE4, the blocks of a subset under consideration being coded according to a predetermined sequential order of traversal PS. In the example represented in FIG. 4A or 4B, the blocks of a current subset SEk ($1 \leq k \leq P$) are decoded one after another, from left to right, as indicated by the arrow PS. On completion of step D2, the decoded subsets of blocks SED1, SED2, SED3, ..., SEDk, ..., SEDP are obtained.

Such a decoding can be of sequential type and, consequently, be performed with the aid of a single decoding unit.

However, so as to be able to benefit from a multiplatform decoding architecture, the decoding of the subsets of blocks is of parallel type and is implemented by a number R of decoding units UDk ($1 \leq k \leq R$), with for example R=4 as represented in FIG. 6A. Such a provision thus allows a substantial acceleration of the decoding method. In a manner known per se, the decoder DO comprises a buffer memory MT which is adapted to contain the symbol occurrence probabilities such as progressively reupdated in tandem with the decoding of a current block.

Figure 6B:
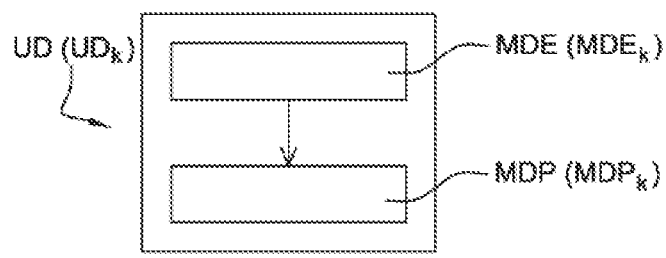
FIG. 6B represents a decoding unit of the decoding device of FIG. 6A.

As represented in greater detail in FIG. 6B, each of the decoding units UDk comprises:
- a module for entropy decoding of said current block by learning at least one probability of symbol occurrence calculated for at least one previously decoded block, denoted MDEk,
- a module for predictive decoding of a current block with respect to said previously decoded block, denoted MDPk.

The predictive decoding module SUDPk is able to perform a predictive decoding of the current block, according to conventional prediction techniques, such as for example in Intra and/or Inter mode.

The entropy decoding module MDEk is for its part of CABAC type, but modified according to the present invention as will be described further on in the description.

As a variant, the entropy decoding module MDEk could be a Huffman decoder known per se.

In the example represented in FIG. 4A or 4B, the first unit UD1 decodes the blocks of the first row SE1, from left to right. When it reaches the last block of the first row SE1, it passes to the first block of the $(n+1)^{th}$ row, here the $5^{th}$ row, etc. The second unit UC2 decodes the blocks of the second row SE2, from left to right. When it reaches the last block of the second row SE2, it passes to the first block of the $(n+2)^{th}$ row, here the $6^{th}$ row, etc. This traversal is repeated as far as the unit UD4, which decodes the blocks of the fourth row SE4, from left to right. When it reaches the last block of the first row, it passes to the first block of the $(n+4)^{th}$ row, here the $8^{th}$ row, and so on and so forth until the last block of the last identified sub-stream is decoded.

Other types of traversal than that which has just been described hereinabove are of course possible. For example, each decoding unit could process not nested rows, as explained hereinabove, but nested columns. It is also possible to traverse the rows or columns in either direction.

With reference to FIG. 5A, the third decoding step D3 is the reconstruction of a decoded image ID on the basis of each decoded subset SED1, SED2, ..., SEDk, ..., SEDP obtained in the decoding step D2. More precisely, the decoded blocks of each decoded subset SED1, SED2, ..., SEDk, ..., SEDP are transmitted to an image reconstruction unit URI such as represented in FIG. 6A. In the course of this step D3, the unit URI writes the decoded blocks into a decoded image as these blocks become available.

In the course of a fourth decoding step D4 represented in FIG. 5A, a fully decoded image ID is delivered by the unit URI represented in FIG. 6A.

Figure 5B:
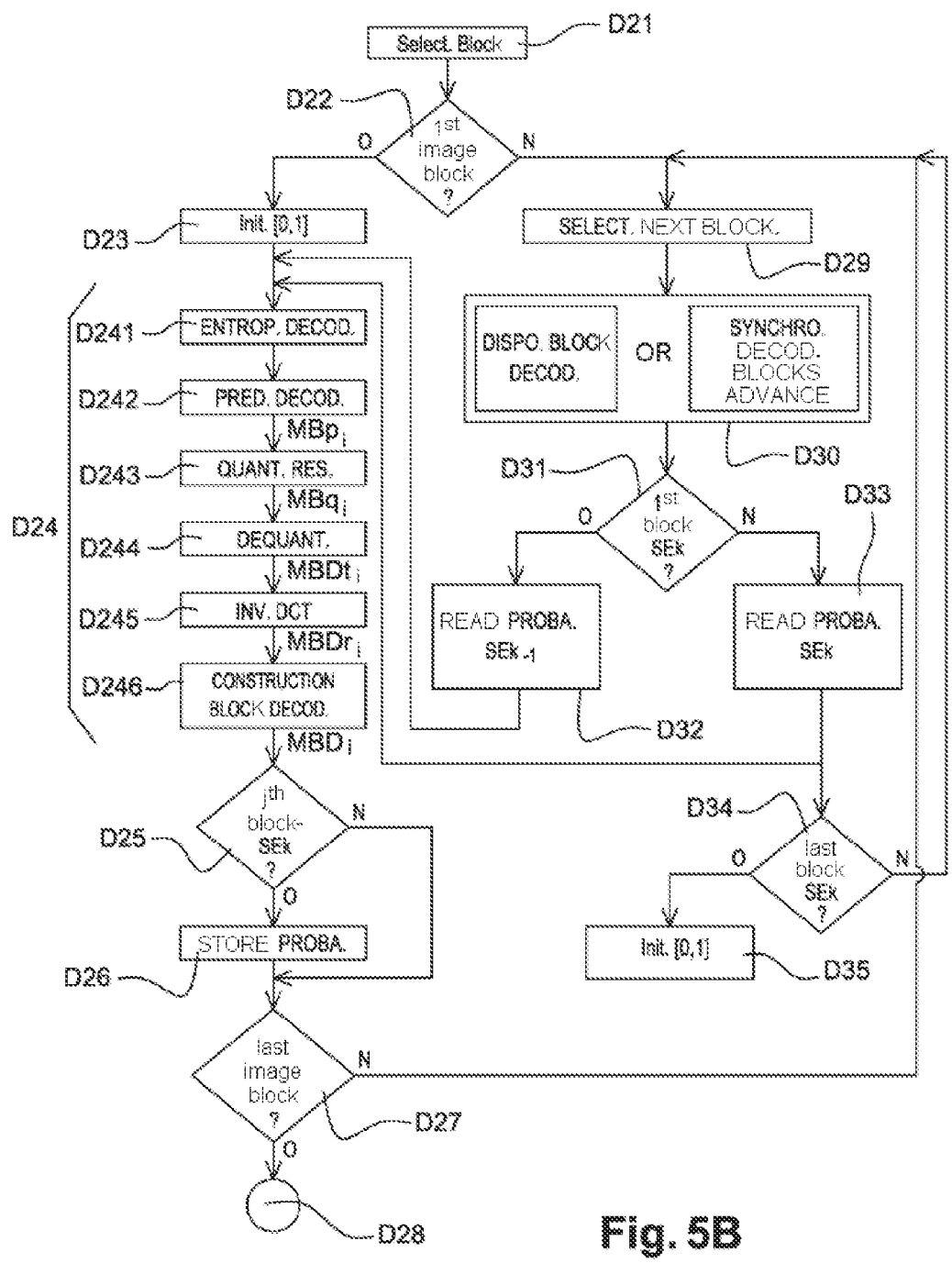
FIG. 5B represents in detail the decoding implemented in the decoding method of FIG. 5A.

The various specific sub-steps of the invention, such as are implemented during the aforementioned step D2 of parallel decoding, in a decoding unit UDk, will now be described with reference to FIG. 5B.

In the course of a step D21, the decoding unit UDk selects as current block the first block to be decoded of the current row SEk represented in FIG. 4A or 4B.

In the course of a step D22, the decoding unit UDk tests whether the current block is the first block of the decoded image, in this instance the first block of the sub-stream F1.

If such is the case, in the course of a step D23, the entropy decoding module MDE or MDEk undertakes an initialization of its state variables. According to the example represented, this entails an initialization of an interval representative of the probability of occurrence of a symbol contained in the predetermined set of symbols.

As a variant, if the entropy decoding used is LZW decoding, a translation table of strings of symbols is initialized, so that it contains all the possible symbols once and only once. Step D23 being identical to the aforementioned coding step C33, it will not be described subsequently.

If subsequent to the aforementioned step D22, the current block is not the first block of the decoded image ID, there is undertaken, in the course of a step D30 which will be described later in the subsequent description, the determination of the availability of the necessary previously decoded blocks.

In the course of a step D24, there is undertaken the decoding of the first current block MB1 of the first row SE1 represented in FIG. 4A or 4B. Such a step D24 comprises a plurality of sub-steps D241 to D246 which will be described hereinbelow.

In the course of a first sub-step D241, there is undertaken the entropy decoding of the syntax elements related to the current block. Such a step consists mainly in:
 a) reading the bits contained in the sub-stream associated with said first row SE1,
 b) reconstructing the symbols on the basis of the bits read.

In the aforementioned variant according to which the decoding used is an LZW decoding, a digital item of information corresponding to the code of the symbol in the current translation table is read, the symbol is reconstructed on the basis of the code read and an update of the translation table is performed, according to a procedure known per se.

More precisely, the syntax elements related to the current block are decoded by the CABAC entropy decoding module MDE1 such as represented in FIG. 6B. The latter decodes the sub-stream of bits F1 of the compressed file to produce the syntax elements, and, at the same time, reupdates its probabilities in such a way that, at the moment at which the latter decodes a symbol, the probabilities of occurrence of this symbol are identical to those obtained during the coding of this same symbol during the aforementioned entropy coding step C345.

In the course of a following sub-step D242, there is undertaken the predictive decoding of the current block MB1 by known techniques of intra and/or inter prediction, in the course of which the block MB1 is predicted with respect to at least one previously decoded block.

It goes without saying that other modes of intra prediction such as proposed in the H.264 standard are possible.

In the course of this step, the predictive decoding is performed with the aid of the syntax elements decoded in the previous step and comprising in particular the type of prediction (inter or intra), and if appropriate, the mode of intra prediction, the type of partitioning of a block or macroblock if the latter has been subdivided, the reference image index and the displacement vector used in the inter prediction mode.

Said aforementioned predictive decoding step makes it possible to construct a predicted block $MBp_1$.

In the course of a following sub-step D243, there is undertaken the construction of a quantized residual block $MBq_1$ with the aid of the previously decoded syntax elements.

In the course of a following sub-step D244, there is undertaken the dequantization of the quantized residual block $MBq_1$ according to a conventional dequantization operation which is the operation inverse to the quantization performed in the aforementioned step C344, to produce a decoded dequantized block $MBDt_1$.

In the course of a following sub-step D245, there is undertaken the inverse transformation of the dequantized block $MBDt_1$ which is the operation inverse to the direct transformation performed in step C343 hereinabove. A decoded residual block $MBDr_1$ is then obtained.

In the course of a following sub-step D246, there is undertaken the construction of the decoded block $MBD_1$ by adding to predicted block $MBp_1$ the decoded residual block $MBDr_1$. The decoded block $MBD_1$ is thus rendered available to be used by the decoding unit UD1 or any other decoding unit forming part of the predetermined number N of decoding units.

On completion of the aforementioned decoding step D246, the entropy decoding module MDE1 such as represented in FIG. 6B contains all the probabilities such as progressively reupdated in tandem with the decoding of the first block. These probabilities correspond to the various elements of possible syntaxes and to the various associated decoding contexts.

Subsequent to the aforementioned decoding step D24, a test is performed, in the course of a step D25, to determine whether the current block is the jth block of this same row, where j is a predetermined value known to the decoder DO which is at least equal to 1.

If such is the case, in the course of a step D26, the set of probabilities calculated for the jth block is stored in the buffer memory MT of the decoder DO such as represented in FIG. 6A and in FIG. 4A or 4B, the size of said memory being adapted for storing the calculated number of probabilities.

In the course of a step D27, the unit UDk tests whether the current block which has just been decoded is the last block of the last sub-stream.

If such is the case, in the course of a step D28, the decoding method is terminated.

If such is not the case, there is undertaken, in the course of step D29, the selection of the next block MB$_i$ to be decoded in accordance with the order of traversal represented by the arrow PS in FIG. 4A or 4B.

If in the course of the aforementioned step D25, the current block is not the jth block of the row SEDk under consideration, step D27 hereinabove is undertaken.

In the course of a step D30 which follows the aforementioned step D29, there is undertaken the determination of the availability of previously decoded blocks which are necessary for decoding the current block $MB_i$. Having regard to the fact that this entails a parallel decoding of the blocks by different decoding units UDk, it may happen that these blocks have not been decoded by the decoding unit assigned to the decoding of these blocks and that they are therefore not yet available. Said determination step consists in verifying whether a predetermined number N' of blocks situated in the previous row SEk−1, for example the two blocks situated respectively above and above and to the right of the current block, are available for the decoding of the current block, that is to say whether they have already been decoded by the decoding unit UDk−1 assigned to their decoding. Said determination step also consists in verifying the availability of at least one block situated on the left of the current block to be decoded $MB_i$. However, having regard to the order of traversal PS chosen in the embodiment represented in FIG. 4A or 4B, the blocks are decoded one after the other over a row SEk under consideration. Consequently, the left decoded block is always available (with the exception of the first block of a row). In the example represented in FIG. 4A or 4B, this entails the block situated immediately to the left of the current block to be decoded. For this purpose, only the availability of the two blocks situated respectively above and above and to the right of the current block is tested.

As this test step is apt to slow down the decoding method, in an alternative manner in accordance with the invention, a clock CLK represented in FIG. 6A is adapted to synchronize the advance of the decoding of the blocks so as to guarantee the availability of the two blocks situated respectively above and above and to the right of the current block, without it being necessary to verify the availability of these two blocks. Thus, as represented in FIG. 4A or 4B, a decoding unit UDk always begins to decode the first block with a shift of a predetermined number N' (here N'=2) of decoded blocks of the previous row SEk−1 which are used for the decoding of the current block. From a software point of view, the implementation of such a clock makes it possible to noticeably accelerate the time to process the blocks of each subset SEk in the decoder DO.

In the course of a step D31, a test is performed to determine whether the current block is the first block of the row SEk under consideration.

If such is the case, in the course of a step D32, there is undertaken the reading in the buffer memory MT solely of the symbol occurrence probabilities calculated during the decoding of the jth block of the previous row SEk−1.

According to a first variant represented in FIG. 4A, the jth block is the first block of the previous row SEk−1 (j=1). Such a reading consists in replacing the probabilities of the CABAC decoder with those present in the buffer memory MT. Entailing as it does the respective first blocks of the second, third and fourth rows SE2, SE3 and SE4, this reading step is depicted in FIG. 4A by the arrows represented by slender lines.

According to a second variant of the aforementioned step D32 which is illustrated in FIG. 4B, the jth block is the second block of the previous row SEk−1 (j=2). Such a reading consists in replacing the probabilities of the CABAC decoder with those present in the buffer memory MT. Entailing as it does the respective first blocks of the second, third and fourth rows SE2, SE3 and SE4, this reading step is depicted in FIG. 4B by the arrows represented by slender dashed lines.

Subsequent to step D32, the current block is decoded by repetition of steps D24 to D28 described above.

If subsequent to the aforementioned step D31, the current block is not the first block of the row SEk under consideration, there is advantageously not undertaken the reading of the probabilities arising from the previously decoded block which is situated in the same row SEk, that is to say the decoded block situated immediately to the left of the current block, in the example represented. Indeed, having regard to the sequential traversal PS for reading the blocks situated in the same row, as represented in FIG. 4A or 4B, the symbol occurrence probabilities present in the CABAC decoder at the moment of beginning the decoding of the current block are exactly that which are present after decoding of the previous block in this same row.

Consequently, in the course of a step D33, there is undertaken the learning of the probabilities of symbol occurrence for the entropy decoding of said current block, said probabilities corresponding solely to those which have been calculated for said previous block in the same row, as represented by the double solid arrows in FIG. 4A or 4B.

Subsequent to step D33, the current block is decoded by repetition of steps D24 to D28 described above.

A test is performed thereafter, in the course of a step D34, to determine whether the current block is the last block of the row SEk under consideration.

If such is not the case, subsequent to step D34, step D29 of selecting the next block $MB_i$ to be coded is implemented again.

If the current block is the last block of the row SEk under consideration, in the course of a step D35, the decoding unit UDk performs a step identical to the aforementioned step D23, that is to say again initializes the interval representative of the probability of occurrence of a symbol contained in the predetermined set of symbols. Such a reinitialization is depicted in FIGS. 4A and 4B by a black dot at the start of each row SEk.

Thus, the decoder DO is in an initialized state at each start of row, thereby allowing great flexibility from the point of view of choosing the level of parallelism of decoding and optimization of the processing time on decoding.

Figure 7A:
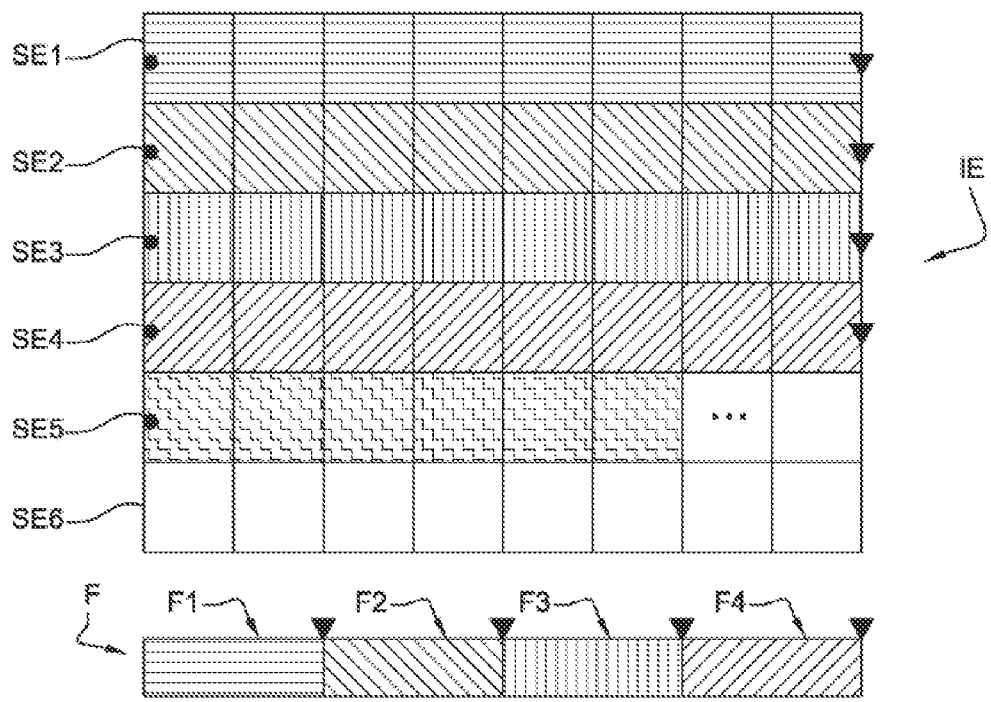
FIG. 7A represents an image coding/decoding diagram implementing a coding of sequential type and a decoding of parallel type.
Figure 7A:
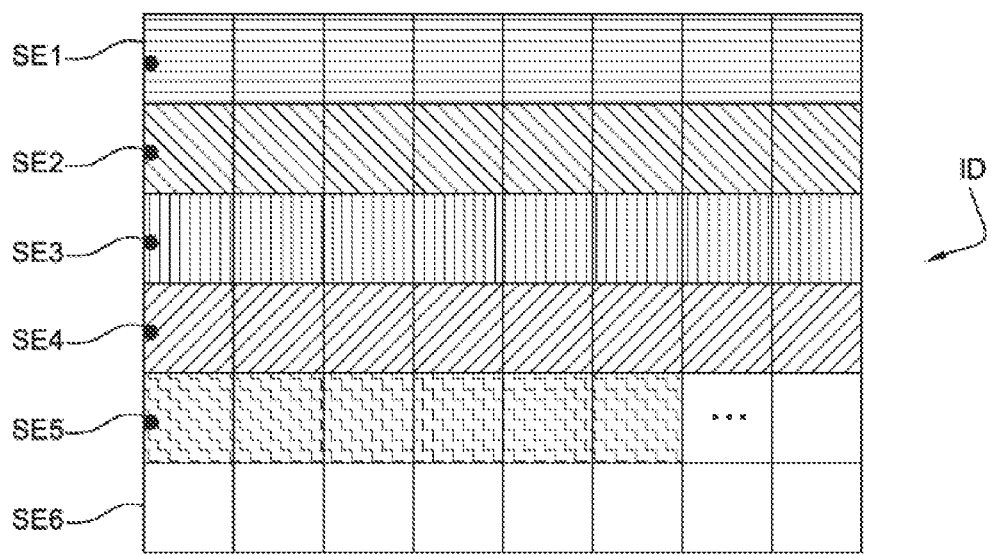

In the exemplary coding/decoding diagram represented in FIG. 7A, the coder CO comprises a single coding unit UC, as represented in FIG. 3A, while the decoder DO comprises six decoding units.

The coding unit UC codes the rows SE1, SE2, SE3, SE4, SE5 and SE6 sequentially. In the example represented, rows SE1 to SE4 are fully coded, row SE5 is in the course of being coded and row SE6 has not yet been coded. Having regard to the sequentiality of the coding, the coding unit UC is adapted for delivering a stream F which contains the sub-streams F1, F2, F3, F4 ordered one following after another, in the order of coding of the rows SE1, SE2, SE3 and SE4. For this purpose, the sub-streams F1, F2, F3 and F4 are symbolized with the same hatching as that which respectively symbolizes the coded rows SE1, SE2, SE3, SE4. By virtue of the emptying steps at the end of the coding of said coded rows and of the reinitialization of the interval of probabilities on commencing the coding or the decoding of the next row to be coded/decoded, the decoder DO, each time that it reads a sub-stream so as to decode it, is in an initialized state and can therefore, in an optimal manner, decode in parallel the four sub-streams F1, F2, F3, F4 with decoding units UD1, UD2, UD3 and UD4 which can for example be installed on four different platforms.

Figure 7B:
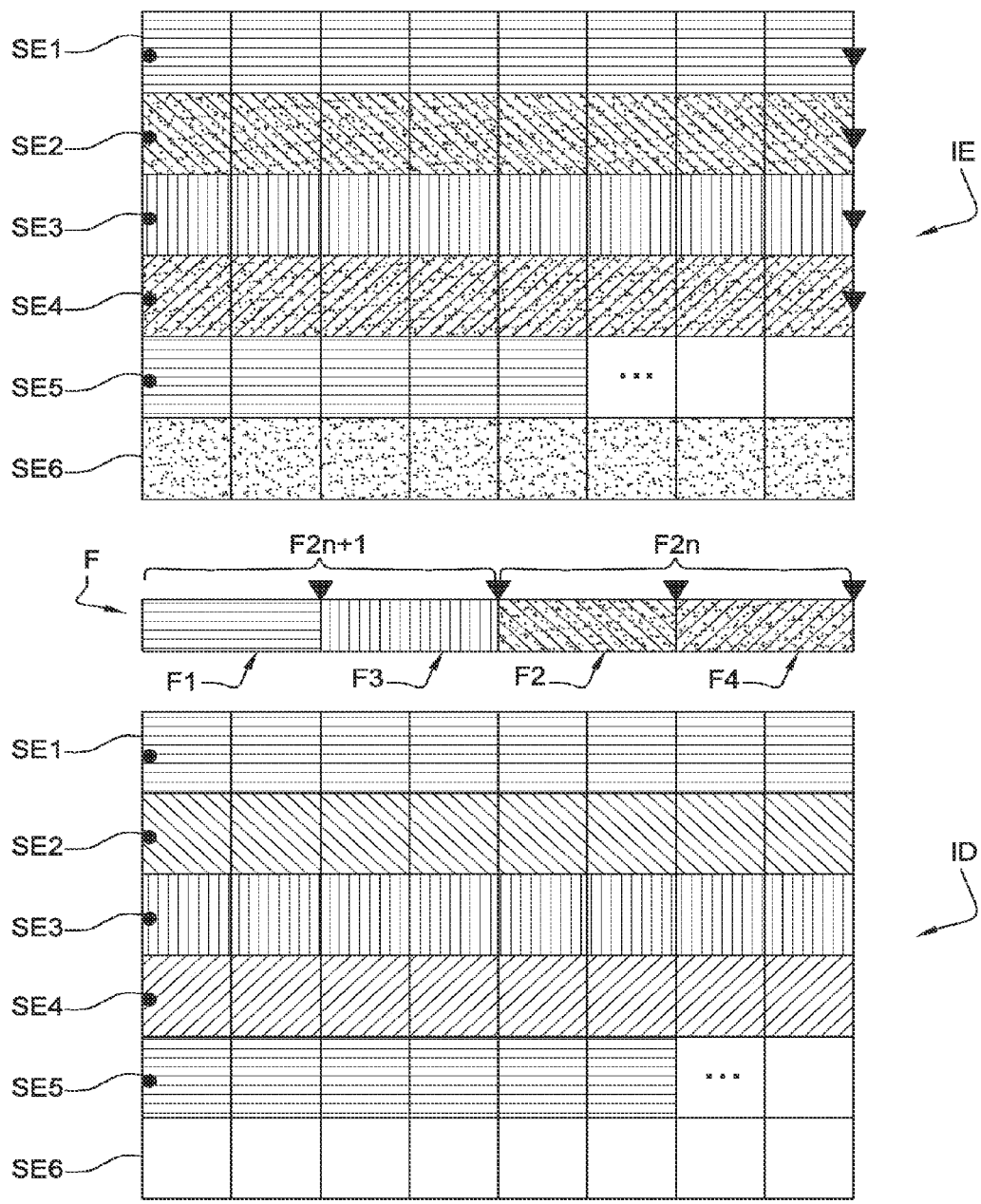
FIG. 7B represents an image coding/decoding diagram implementing a coding/decoding of parallel type, with respectively different levels of parallelism.

In the exemplary coding/decoding diagram represented in FIG. 7B, the coder CO comprises two coding units UC1 and UC2, as represented in FIG. 3C, while the decoder DO comprises six decoding units.

The coding unit UC1 sequentially codes the rows of odd rank SE1, SE3 and SE5, while the coding unit UC2 sequentially codes the rows of even rank SE2, SE4 and SE6. For this purpose, rows SE1, SE3 and SE5 exhibit a white background, while rows SE2, SE4 and SE6 exhibit a dotted background. In the example represented, rows SE1 to SE4 are fully coded, row SE5 is in the course of being coded and row SE6 has not yet been coded. Having regard to the fact that the coding performed is of parallel type of level 2, the coding unit UC1 is adapted for delivering a sub-stream $F_{2n+1}$ decomposed into two parts F1 and F3 obtained subsequent to the coding respectively of rows SE1 and SE3, while the coding unit UC2 is adapted for delivering a sub-stream $F_{2n}$ decomposed into two parts F2 and F4 obtained subsequent to the coding respectively of rows SE2 and SE4. The coder CO is therefore adapted for transmitting to the decoder DO a stream F which contains the juxtaposition of the two sub-streams $F_{2n+1}$ and $F_{2n}$ and therefore an ordering of the sub-streams F1, F3, F2, F4 which differs from that represented in FIG. 7A. For this purpose, the sub-streams F1, F2, F3 and F4 are symbolized with the same hatching as that which respectively symbolizes the coded rows SE1, SE2, SE3, SE4, the sub-streams F1 and F3 exhibiting a white background (coding of the rows of odd rank) and the sub-streams F2 and F4 exhibiting a dotted background (coding of the rows of even rank).

With respect to the advantages mentioned in conjunction with FIG. 7A, such a coding/decoding diagram furthermore presents the advantage of being able to employ a decoder whose level of parallelism of decoding is completely independent of the level of parallelism of the coding, thereby making it possible to optimize the operation of a coder/decoder still further.

The invention claimed is:

1. An image decoding method comprising:
   receiving a bitstream representative of at least one coded image;
   identifying, from the bitstream, a predetermined plurality of groups of blocks representative of the at least one coded image;

processing a first group of blocks, wherein the processing of the first group comprises:
  entropy decoding a first row of consecutive blocks within the first group of blocks;
processing a second group of blocks, wherein the processing of the second group comprises:
  entropy decoding a second row of consecutive blocks within the second group of blocks;
wherein the second row of consecutive blocks is immediately after the first row of consecutive blocks in a raster order of an image decoded from the at least one coded image; and
wherein the second row of consecutive blocks is not immediately after the first row of consecutive blocks in the bitstream.

2. The computer-implemented method of claim 1 comprising:
receiving the bitstream representative of the at least one coded image from a coding system comprising one or more coding units for coding each of the groups of blocks; and
distributing the plurality of groups of blocks to one or more decoding units, the one or more decoding units differing in quantity from the one or more coding units.

3. The computer-implemented method of claim 1 comprising:
predictive decoding each of the plurality of blocks with respect to at least one previously decoded block.

4. The computer-implemented method of claim 1 comprising:
updating, to a memory unit, probability data based at least on entropy decoded data from entropy decoding the first group of blocks.

5. The computer-implemented method of claim 1 comprising:
processing a third block in a given group of blocks, wherein the processing of the third block comprises:
  entropy decoding the third block in accordance with probability data having been updated based at least on entropy decoded data from entropy decoding a preceding block.

6. The computer-implemented method of claim 1 comprising:
determining that a first block in the first group of blocks is associated with a predetermined column; and
responsive to determining that the first block is associated with the predetermined column, storing probability data associated with entropy decoding the first block to a buffer.

7. The computer-implemented method of claim 1 comprising:
processing a first block in the first group of blocks, the processing of the first block comprising:
  retrieving probability data from a buffer; and
  entropy decoding the first block in accordance with the probability data, the probability data comprising probabilities of occurrence of symbols associated with blocks from one or more other groups of blocks.

8. The computer-implemented method of claim 1, wherein entropy decoding a second block in the second row of blocks comprises entropy decoding the second block in accordance with current probability data, and wherein the method further comprises:
determining that the second block is a last block in the second group of blocks to be decoded; and
responsive to determining that the second block is the last block in the second group of blocks to be decoded, reinitializing the probability data, wherein reinitializing the probability data comprises modifying the current probability data to reflect probability data having been updated based at least on entropy data from entropy decoding a subset of blocks in the second group of blocks.

9. A system comprising:
one or more processors and one or more storage devices storing instructions that, when executed by the one or more processors, cause the one or more processors to perform operations comprising:
receiving a bitstream representative of at least one coded image;
identifying, from the bitstream, a predetermined plurality of groups of blocks representative of the at least one coded image;
processing a first group of blocks, wherein the processing of the first group comprises:
  entropy decoding a first row of consecutive blocks within the first group of blocks;
processing a second group of blocks, wherein the processing of the second group comprises:
  entropy decoding a second row of consecutive blocks within the second group of blocks;
wherein the second row of consecutive blocks is immediately after the first row of consecutive blocks in a raster order of an image decoded from the at least one coded image; and
wherein the second row of consecutive blocks is not immediately after the first row of consecutive blocks in the bitstream.

10. The system of claim 9 the operations further comprising:
receiving the bitstream representative of the at least one coded image from a coding system comprising one or more coding units for coding each of the groups of blocks; and
distributing the plurality of groups of blocks to one or more decoding units, the one or more decoding units differing in quantity from the one or more coding units.

11. The system of claim 9 the operations comprising:
predictive decoding each of the plurality of blocks with respect to at least one previously decoded block.

12. The system of claim 9 the operations comprising:
updating, to a memory unit, the probability data based at least on entropy decoded data from entropy decoding the first group of blocks.

13. The system of claim 9 the operations comprising:
processing a third block in a given group of blocks, wherein the processing of the third block comprises:
  entropy decoding the third block in accordance with probability data having been updated based at least on entropy decoded data from entropy decoding a preceding block.

14. The system of claim 9 the operations comprising:
determining that a first block in the first group of blocks is associated with a predetermined column; and
responsive to determining that the first block is associated with the predetermined column, storing probability data associated with entropy decoding the first block to a buffer.

15. The system of claim 9 the operations comprising:
processing a first block in the first group of blocks, the processing of the first block comprising:
  retrieving probability data from a buffer; and
  entropy decoding the first block in accordance with the probability data, the probability data comprising probabilities of occurrence of symbols associated blocks from one or more other groups of blocks.

16. The system of claim 9, wherein entropy decoding a second block in the second row of blocks comprises entropy decoding the second block in accordance with current probability data, and wherein the method further comprises:
    determining that the second block is a last block in the second group of blocks to be decoded; and
    responsive to determining that the second block is the last block in the second group of blocks to be decoded, reinitializing the probability data, wherein reinitializing the probability data comprises modifying the current probability data to reflect probability data having been updated based at least on entropy data from entropy decoding a subset of blocks in the second group of blocks.

17. A non-transitory computer-readable medium storing software comprising instructions that, when executed by one or more computers, cause the one or more computers to perform operations comprising:
    receiving a bitstream representative of at least one coded image;
    identifying, from the bitstream, a predetermined plurality of groups of blocks representative of the at least one coded image;
    processing a first group of blocks, wherein the processing of the first group comprises:
        entropy decoding a first row of consecutive blocks within the first group of blocks;
    processing a second group of blocks, wherein the processing of the second group comprises:
        entropy decoding a second row of consecutive blocks within the second group of blocks;
    wherein the second row of consecutive blocks is immediately after the first row of consecutive blocks in a raster order of an image decoded from the at least one coded image; and
    wherein the second row of consecutive blocks is not immediately after the first row of consecutive blocks in the bitstream.

18. The computer-readable medium of claim 17, wherein the operations comprise:
    receiving the bitstream representative of the at least one coded image from a coding system comprising one or more coding units for coding each of the groups of blocks; and
    distributing the plurality of groups of blocks to one or more decoding units, the one or more decoding units differing in quantity from the one or more coding units.

19. The computer-readable medium of claim 17, wherein the operations comprise:
    predictive decoding each of the plurality of blocks with respect to at least one previously decoded block.

20. The computer-readable medium of claim 17, wherein the operations comprise:
    updating, to a memory unit, probability data based at least on entropy decoded data from entropy decoding the first group of blocks.

* * * * *